Patented June 27, 1939

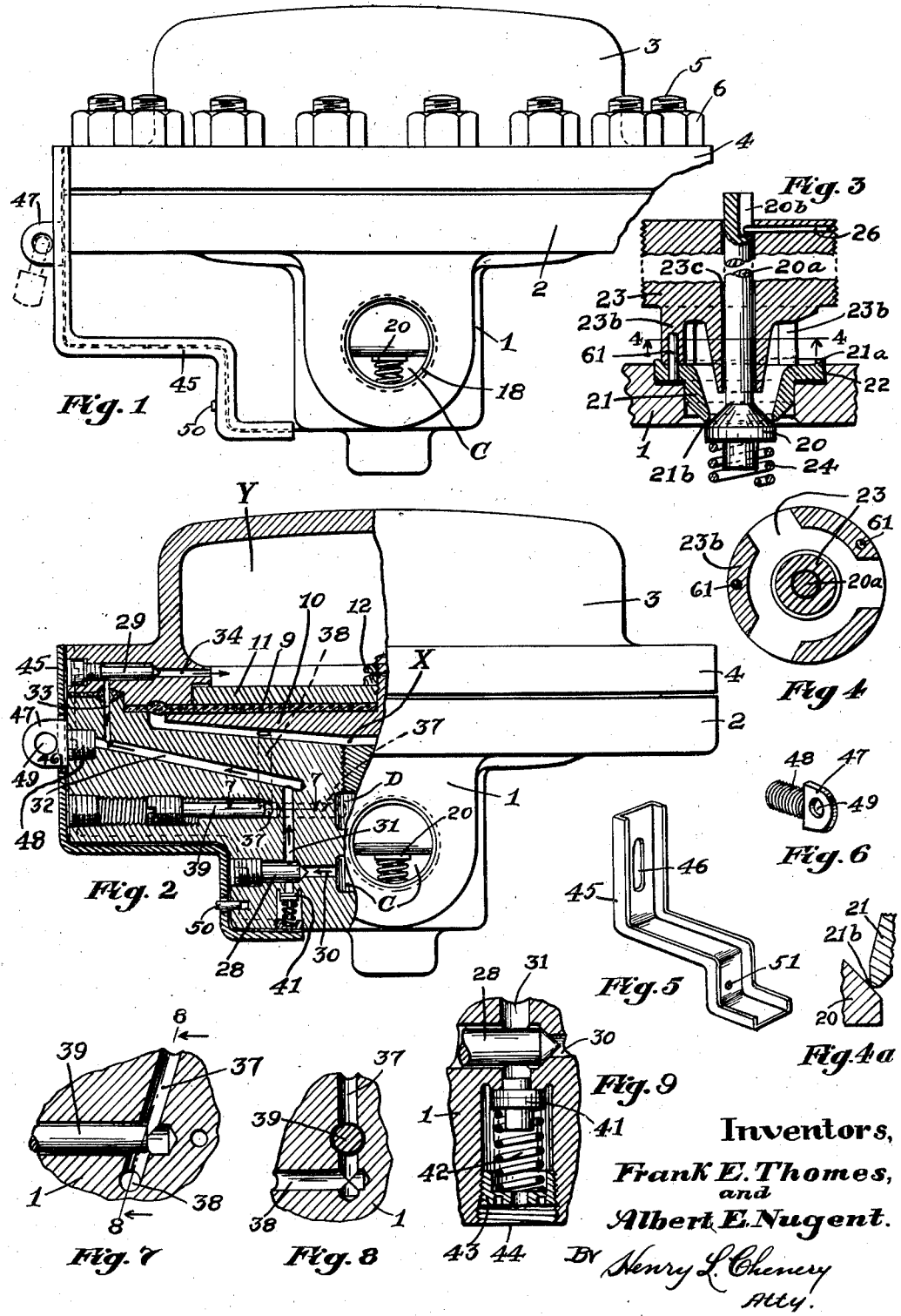

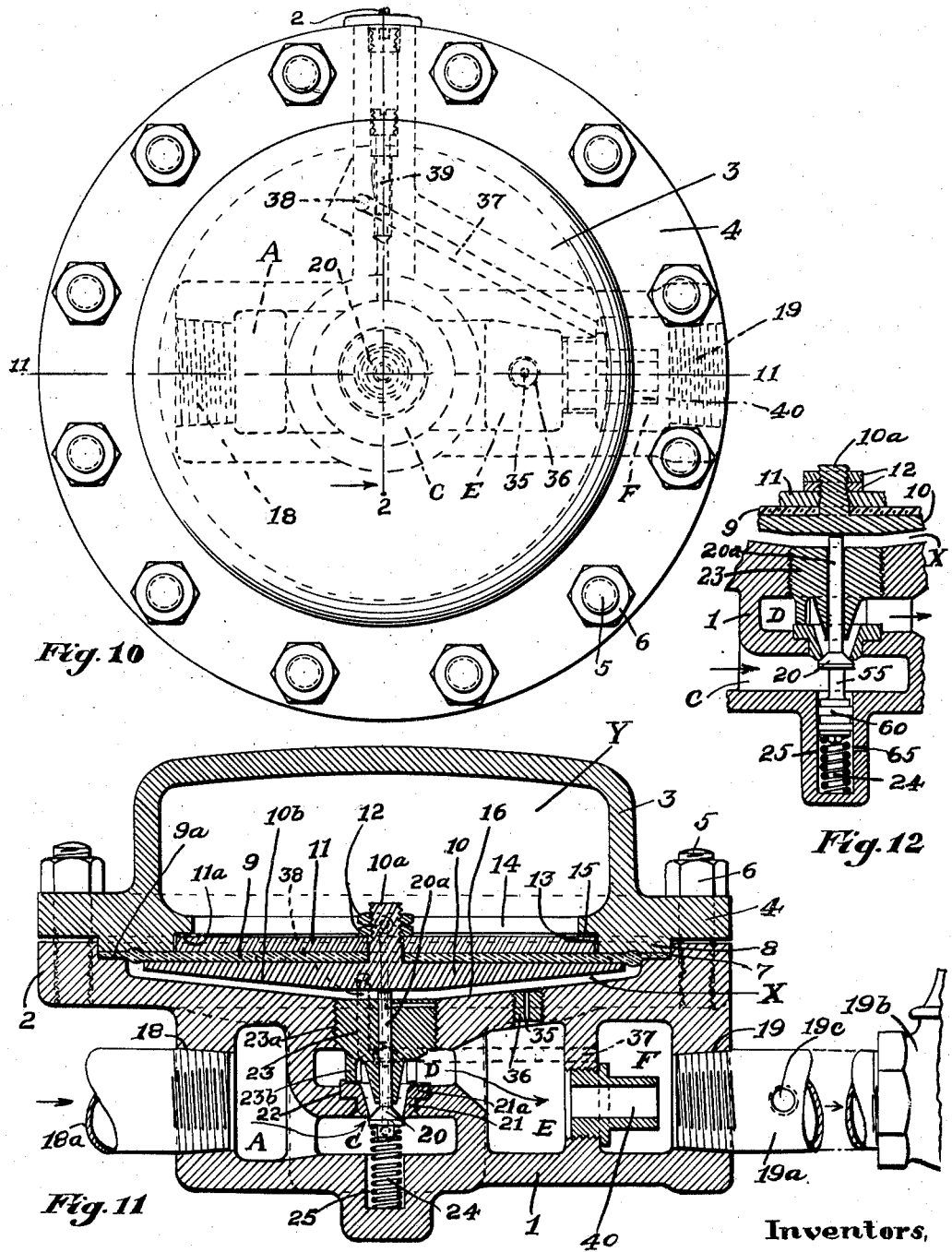

2,164,095

UNITED STATES PATENT OFFICE 2,164,095

AIR-PRESSURE REDUCING AND REGULATING DEVICE

Frank E. Thomes, South Portland, and Albert E. Nugent, Portland, Maine, assignors to Industrial Development and Manufacturing Corporation, Portland, Maine Application September 30, 1936, Serial No. 103,468

5 Claims. (Cl. 50—16)

The invention hereinafter to be described relates, in general terms, to air-reducing and regulating devices capable of receiving a highly compressed fluid, in this case air, reduce its gauge pressure and deliver it, automatically increased in volume and lowered to any predetermined pressure.

The commercial use of the so-called "regulating" valve is largely confined to initial pressures of five hundred pounds or less, but in the present invention we are dealing with structure which must handle initial pressures of three thousand pounds, or more, per square inch gauge pressure, and reduce this to pressures as low as one hundred pounds, possibly less. Furthermore, the device must maintain a delivery of this low pressure air at a consistent degree of accuracy, automatically.

An example, illustrative of one application in which our high-low duty regulator is particularly serviceable, is in connection with its use on board naval vessels, as submarines and destroyers, in which pressures around the three thousand pound mark are employed to discharge torpedoes therefrom.

But there are numerous other demands for compressed air in these vessels, ranging from pressures of six hundred to five pounds per square inch, and it is in connection with this service, taking the initial pressure of three thousand pounds from the source of supply, and diverting it to low pressure duty, that we will illustrate and describe one type of our reducing and regulating apparatus.

The type of apparatus with which the present invention is concerned must qualify in several essential requirements, among which are the following:

1. Ability to function where a wide range between inflow and outflow pressures of the compressed air exists.

2. Maintenance of a predetermined volume at a substantially constant pressure of air delivered to the air-service line.

3. Accessibility of the parts for inspection or repairs.

4. Simplified construction to insure continuous operation.

5. Safety factor, in that should a rupture of the diaphragm take place, the valve would immediately close and prevent high pressure air entering the air-service system, and 6. Provision made against excessive vibration and pounding of the main valve on its seat when variations in outflow of the air from the device occurs, and more especially when the valve is approaching or just leaving its seat.

Our air-reducing and regulating apparatus embodies structure calculated to qualify in each particular as above enumerated; and to procure a clearer understanding of the import of our invention reference should be had to the description found in the following specification, taken in connection with the accompanying drawings disclosing an embodiment which, at the present time, we consider preferable to other possible forms in which the invention might be carried out.

In the drawings, in which similar reference characters are employed to identify like parts throughout, Fig. 1 represents a side elevation of the apparatus;

Fig. 2 is the same, except that the left-hand portion of this view is shown in vertical section, taken on line 2—2, of Fig. 9;

Fig. 3 is a central sectional elevation of the main valve;

Fig. 4 is a section on line 4—4, Fig. 3;

Fig. 4a shows a detail in the valve and seat construction, on a somewhat enlarged scale;

Fig. 5 is a perspective view of the guard plate;

Fig. 6 is a plug which is secured in the body of the device which together with the guard plate protects the by-passing valves and prevents tampering therewith;

Fig. 7 is a section on line 7—7, Fig. 2;

Fig. 8 is a section on line 8—8, Fig. 7;

Fig. 9 is a sectional elevation of the relief valve shown in Fig. 2;

Fig. 10 is a plan view of the apparatus;

Fig. 11 is a sectional elevation of the device, the section being taken on line 11—11, Fig. 10, and Fig. 12 shows an alternative valve construction.

The pressure-reducing and regulating apparatus for compressed air power units herewith presented operates, primarily, on the direct action principle, with a main valve actuated by and operating in close association with a diaphragm which, through instrumentalities a description of which will hereinafter be explained, responds to variations in pressure of the air in the service lines, to either open or close the main valve.

The apparatus comprises a body member 1, on the upper portion of which but integral therewith is a flange 2. Surmounting this flange is a dome or as usually designated a bonnet member 3 having a flange 4, the counterpart of flange 2, to which latter it is secured by bolts 5 and nuts 6.

In the flange 2 is a counterbore 7 within which is disposed the annular, shouldered portion 8 of the flange 4, and seated in the bottom of the counterbore 7 is the marginal portion 9a of the rubber diaphragm 9. By setting up on the nuts 6 the marginal portions of the diaphragm are firmly bound between the two flanges 2 and 4.

Beneath the diaphragm 9 is a downwardly crowned bottom plate 10, and rising from this plate is a post 10a which passes through the diaphragm and also through the top plate 11. The nuts 12 effect a strong embrace by the two plates of all but the marginal portions of the diaphragm.

It will be observed that the marginal portions 11a of the plate 11 are disposed in a counterbore 13 made in the bottom of the bonnet 3, and a bore 14 of less diameter than the counterbore leaves a shoulder 15 all-around.

This shoulder constitutes a stop to prevent excessive upward movement of the diaphragm which might otherwise occur should a sudden rise in pressure in the service line take place, occasioned by a quick shut-down of one or more of the service-air-using units. There will always be a space, however, between the plate 11 and the shoulder 15 when the valve 20 is on its seat and its spindle 20a in contact with the bottom side of the plate 10.

On the top central portion of the body 1 is a depression with a bottom surface 16 slightly declining toward the axis of the body. The surface 16 and the bottom face 10b of the plate 10 are substantially parallel, and spaced to leave a very shallow chamber X.

The body of the device has an inlet opening 18, tapped to receive the air inflow pipe 18a, and a discharge opening 19, tapped for the reception of the outflow pipe 19a.

Axially of the body 1 is located the main valve 20 positioned in the valve cage 21, the flange 21a of which seats in the counterbore 22. A plug 23 having screw-threaded engagement with the body in the tapped hole 23a has depending wings 23b which, when the plug is screwed down, firmly lock the valve cage 21 in its associated counterbore 22.

The spindle 20a of the main valve 20 extends upwardly through the bore 23c of the plug 23 and contacts, normally, the bottom face of the plate 10. A helical wound spring 24, of sufficient expansible strength to hold the valve 20 lightly on its seat against the weight of the diaphragm and the two plates between which it is clamped, is disposed in a bore 25 made in the bottom portion of the body 1. The upper end of the spring thrusts on the valve and its lower end seats in the bottom of the bore 25.

It has been found advantageous to hold the valve 20 against rotation on its axis. Thus when it is on its seat it is always disposed in the same position, relative thereto, which may, perhaps, be contrary to usual practice.

To accomplish this object the upper end of the spindle 20a is splined for a short distance from its end, forming a key-way 20b which is engaged by a key-pin 26 extending through one-half of the screw plug 23.

It is assumed, for purposes of illustration, that the present invention is being used in a service where the initial compressed air supply is of approximately three thousand pounds pressure per square inch.

The admission of this highly compressed fluid is through the inlet pipe 18a, and passing into the chamber C this high pressure is brought to bear on the under side of the valve 20, exerting a force, to close the valve, of three thousand pounds times the area of the valve seat opening.

This means, of course, that the force tending to seat the valve must be overbalanced before admission of the air to the service line can be brought about.

It is obvious that the air in chamber Y must first be raised in pressure to a point which, by acting on the upper side of the diaphragm 9, will exert a force slightly greater than that which at this time is being applied to the bottom side of the valve 20 to seat it, including the effective uplifting power of the spring 24. This has the effect of un-seating the valve and permit air to pass through the apparatus into the service line 19a.

If reference be had to Fig. 2 it will be observed that a labyrinth of port-ways or by-passes is made in the body 1, interconnecting the chambers C and Y, thus avoiding obtrusive outside piping.

The high pressure air in passing from chamber C to chamber Y is controlled by two valves, 28 and 29 respectively. The preferable method of starting the priming of chamber Y is to first open the valve 29, then by "cracking" the valve 28 (which means opening the valve sufficiently to permit the air to wire-draw through the valve seat opening) control over the high pressure air is assured, and the chamber Y gradually raised in air-pressure, the air passing through port-way 30, and successively through the port-ways 31, 32, 33 and 34.

After a pressure predetermined by the requirements of the service line has been attained the valves 28 and 29 are tightly closed, sealing the chamber Y. In this manner any desired pressure comparable to that to be carried on the line 19a can be procured in chamber Y, a pressure gauge (not shown) generally being installed on the service line connecting with the tapped hole 19c therein. At the time of closing the valves 28 and 29 the pressures in chamber Y and the service line will be substantially the same, although when the apparatus is working from say one-half to full capacity the service line pressure will drop somewhat.

But it must be borne in mind that at the start of the by-passing operation to raise the pressure of the air in chamber Y, the valve 19b being at this time closed, there is atmospheric pressure, only, in the confined air space within the body 1 in advance of the valve 20, meaning that space which is in communication with the under side of the diaphragm 9 by way of the aperture 35 and ports 37 and 38. Subsequently there will be a pressure above that of the atmosphere in the aforesaid space which will act to counterbalance in a large measure the force acting on the top side of the diaphragm.

It is evident, therefore, that at this time, and in the absence of any resistance to the downward movement of the diaphragm by reason of air under gage pressure acting on its under side, the pressure in chamber Y which would be required to open the valve 20 against the force constantly being applied to its under side to hold, or tend to hold it closed, will be very much less than will ultimately be the case when the apparatus is working under operative conditions.

Now in the hypothetical case under consideration, it is assumed that the source of supply of compressed air, to be reduced in pressure for use in the service line, starts with an initial gage pressure of three thousand pounds per square inch, this force bearing on the under side of valve 20.

With properly proportioned areas of diaphragm 9 and valve 20 a gage pressure of the air in chamber Y of say ten to fifteen pounds would be sufficient to cause the valve to move off its seat. This will permit air of a higher pressure to enter the space in communication with the under side of the valve 20, including the space in the service line up to a valve 19b which it is customary to install thereon in close proximity to the apparatus. This valve (19b) is closed during the by-passing operation of air from chamber C to chamber Y.

The air will continue to flow into the before mentioned space until the pressure acting on the under side of the diaphragm rises to a point where it is beginning to balance the pressure applied to its top surface, causing the valve to move toward its seat. But meantime more air is being admitted under an increasing pressure to the chamber Y and a reverse movement of the valve takes place, due to a slight preponderance of pressure on the top side of the diaphragm.

This near-balancing and un-balancing of the pressures acting, respectively, on the top and bottom sides of the diaphragm continues until the pressure which it is desired to carry on the service line is shown on the gage mounted on the line at 19a. The valves 28 and 29 are now closed and the air chamber Y sealed, the air therein being under a pressure of approximately one hundred and fifty-five pounds, assuming that the service line pressure under average working conditions is one hundred and fifty, or perhaps slightly under this amount. If other line pressures are preferred, the pressure maintained in chamber Y will need to be changed accordingly.

In any event, the pressure in chamber Y will normally be greater than the average service-line working pressure for any predetermined chamber Y pressure.

One difficulty encountered in operating air-reducing devices of the conventional type resides in the tendency of the valve to chatter and pound on its seat as it opens and closes, particularly noticeable when high initial pressures are employed and the air is wire-drawing through the valve opening. Various expedients have been resorted to to cure this fault, but in most cases with questionable success.

In our present invention we have largely eliminated this shortcoming by providing two means of communication between the chamber X and the two chambers E and F, respectively, these interconnecting ducts being the aperture 35 and the ports or passage-ways 37 and 38.

When the apparatus is in operation and a sudden and excessive demand is made on the service line 19a, incident, for instance to starting more of the compressed-air-using units, the first effect will be felt in the sudden lowering of the pressure in chamber F. This chamber being in direct communication with chamber X, through the ports 37 and 38, draws on the latter chamber, reducing the pressure and causing the diaphragm to be depressed and more widely open the valve 20 for the admission to the system of more and higher pressure air.

But a too sudden opening of the valve 20 by withdrawal of the pressure on the under side of the diaphragm might cause an excess inflow of air to the service line with more or less fluctuation in pressure therein. Furthermore, should normalcy be quickly restored in the chambers and service line the rebound of the valve in closing might cause it to pound its seat.

It is, of course, desirable to have a reasonably rapid response of the valve to any deviation in contancy of pressure in the service line, but impulsive reactions of the diaphragm are not conducive to a steady movement of the valve 20 toward or from its seat; so, by restricting the passage-way 37—38 to a comparatively small opening, relative to the area of the diaphragm, the draft on the air in chamber X while immediately started, after the drop in pressure in chamber F occurs, is not instantaneous in its full effect for the reason that it takes time for the air to pass through the small-area passage-way. Thus undue rapidity in the movement of the diaphragm to increase the valve opening is prevented by drafting the air from chamber X in a small but steady volume.

But as a further co-acting instrumentality in preventing premature reduction in pressure in chamber X the extremely small aperture 35 is provided. While air is being drafted from chamber X through ports 37—38, reducing the pressure more or less rapidly, air of higher pressure is being forced into the chamber through aperture 35 in an extremely small volume but sufficient to put a check on the exhaustion of the air beneath the diaphragm over-expeditiously.

It is thus apparent that two forces are acting on the air in chamber X, one decreasing and the other increasing its pressure. But of course the two forces cannot be equal, since in that case no additional opening of the valve could take place to fill the void arising from a sudden demand on the system and consequent drop in pressure in the service line.

It is for this reason that the ports 37 and 38, while small themselves relative to the area of the diaphragm, are made much larger than the aperture 35, the preponderant force thus residing in the capacity of the ports to lower the pressure in chamber X more rapidly than this pressure can be replaced by entrance of higher pressure air through the aperture 35, until normal pressure in line 19a is established.

But it is a somewhat difficult matter to establish by calculation the proper proportionate difference in areas of the ports and aperture, so we have elected to provide means whereby this relative difference may be varied to suit varying conditions with respect to service line pressures.

To this end we have incorporated in the structure a plunger valve element 39 serving in association with the port 37 to vary the effective area of this port and the volume of air which can by adjustment of this element 39 be drafted through it. In this manner the correct proportion of charge and discharge of air into and from the chamber X through the ports and aperture can be determined by adjustments made in the element 39.

In Fig. 2 the port 38 is not shown in true section as in reality it is positioned on the near side of the central line on which the section is taken. It is shown in this view simply to disclose its relative position in the body of the apparatus.

An improvement which we consider of vital importance in our air-reducing and regulating apparatus pertains to the nozzle 40, connecting chambers E and F. It operates in conjunction with the other parts of the device somewhat on the principle of an injector.

It might further be compared with the ordinary water hose nozzle which, by constricting the discharge orifice, speeds the outflow of the water.

In the present apparatus this nozzle is extended nearly the full length of chamber F and terminates in close proximity to the discharge opening 19. By its use a drafting effect on the air in chamber F is effected, and while compressed air from chamber E supplies air to fill chamber F the speed with which the fluid passes through the nozzle into the service line 19a creates, when the service line is drawing heavily, something of a void in chamber F, thereby lowering its pressure.

This suctional effect on the contents of chamber F is also communicated to chamber X by way of the port-ways 37 and 38, which accounts for the fact that when the apparatus is working at from one-half to full capacity air for diaphragm-balancing purposes enters the chamber X largely through the aperture 35 and exits therefrom through the port-ways 37 and 38. There is also more or less seepage or leakage of the highly compressed air into chamber X around the valve spindle 20a, which obviously cannot be leak tight and operate freely in the bore 23c. It is therefore evident that the air pressure in chamber E is slightly greater than in chamber F under ordinary working conditions.

In by-passing the high pressure air into chamber Y the air-gauge previously mentioned is a visual guide for determining when the operation should stop. As a precautionary measure, however, we provide a relief valve 41 the spring 42 for which may be adjusted for more or less expansible force by the screw plug 43 which has a vent 44 for the escape of air should the valve open.

After completing the operation of by-passing the high pressure air from chamber C to chamber Y and the valves 28 and 29 are closed, it is quite important that protection is provided against tampering with these valves as the pressure established in the bonnet chamber is the controlling factor in maintaining a constant working pressure in the service line.

For the carrying out of the foregoing requirement we supply a channelled member 45 which conforms to the contour of the end and bottom portion of the device, covering the openings in which operate the valves 28 and 29 and the relief valve 41, a slotted hole 46 in the outer end portion of the channel member offering means to secure it on the wing 47 of the screw 48, which latter is securely fixed in the body 1 of the device, the foregoing structure being illustrated in Figs. 2 and 5. A pin 50 engages a hole 51 in the channel member to provide further security against displacement thereof from the apparatus, and the yoke portion of a pad-lock (shown in dot and dash lines, Fig. 1) is inserted in the hole 49 of the wing screw plug as a final measure of security.

In all types of apparatuses it is desirable to hold the size of the parts to minimum dimensions if by so doing there be no sacrifice in efficiency of operation.

In our present invention, particularly in its application to extremely high air pressures, we have been confronted with the problem of keeping the diameter of the diaphragm within bounds and at the same time employ a valve the size of which would supply a consistent volume of air to the service lines.

As it is necessary to limit the chamber Y pressure to slightly more than that carried on the service line, the area of the diaphragm must be such as will when multiplied by the chamber pressure per square inch closely approximate the total force acting to close the main, unbalanced valve 20. This requires a quite sizeable diaphragm.

As an alternative construction which we may elect to adopt, we show in Fig. 12 a so-called balanced valve. Its adoption would involve substantially the same structure as the arrangement hereinbefore described, except that an extended portion 55 depends from the main valve 20 and on the lower end of this extension is a piston valve 60, the latter operating in the bore 25 in which also is disposed the spring 24 which normally acts to support the weight of the valve and diaphragm parts. A vent 65 is for the purpose of allowing air which might pass by the piston 60 to escape.

This last described construction would require a quite diminutive size diaphragm compared with the first apparatus a description of which has been set forth, and would permit using a valve of such size as would greatly enlarge the capacity of the air-reducing device.

The only feature which in some instances might be objectionable, as for instance, in naval vessel service, is that should anything go wrong with the valve-and-diaphragm-supporting spring 24 there could be no recourse to the extremely high pressure in the air inlet chambers to close the main valve and prevent possible entrance to the service line of the high initial pressure with consequent damage to some of the power service units. The valve in this case would be inert, or substantially so.

Particular attention is called to the structural design and method of fabricating the parts comprising the main valve assembly of our apparatus, including the valve 20, the valve cage 21 and the screw-plug or valve spindle guide 23.

In conventional practice it is quite usual to construct the valve cage and valve spindle guide as a unit, and form the valve seat with a considable width of "land" or surface upon which the valve bears when closed, the valve and seat being "ground" together to insure a perfect fit over the entire contacting surfaces.

For reasons which we will presently explain we prefer to construct the members 21 and 23 as separate units rather than make them integral.

In the first place we have found in actual practice that a more satisfactory result is assured by making one of these members hard and the other soft. We have, therefore, elected to employ some resisting metal, such as hardened steel, for the valve cage 21, and a non-resisting metal, as for instance, composition or one of the bronzes, for the member 20.

Furthermore, in the matter of the form of the seat we have, we believe, departed somewhat from usual practice.

If reference be had to Fig. 4a, wherein a fragmentary view of the valve and valve cage is depicted, it will be observed that the lower end of the cage is bored substantially straight for a short distance upwardly, and the extreme bottom surface faced square with the axis of the cage. This leaves a sharp, square edge or corner all around the opening, and this edge is simply worked off or beveled the least amount. And the cage being hard, it will, when the portion 21b is brought into contact with the valve, form a cooperating seat thereon, conducive to tightness of fit of the parts.

Then, too, our design of valve seat permits the air to pass the valve with less frictional resistance and for this reason a larger volume, for a like movement of valve of the conventional type, can pass into the service line.

And this lastly named feature or advantage makes it possible to employ smaller units, particularly with respect to the diaphragm and valve cage opening diameters, for the same capacity apparatus, as usually supplied.

Another characteristic of our sharp edge valve seat is its ability to cut and clear itself of frost and ice which at times accumulates on the valve structure. With the wider "land" type of seat this would be more difficult if not impossible. This applies more particularly to high initial pressure apparatuses.

Description of our method of locking the valve against rotation on its seat has already been set forth. We also provide means to prevent rotation of the valve cage 21 relative to the valve stem guide 23, embodying one or more pilot pins 61 inserted in holes drilled through the flange 21a of the cage into the depending wings 23b of the member 23. This insures, once the parts are assembled, holding the valve against re-positioning itself with respect to rotational movement on its seat.

For descriptive purposes the chamber Y may be designated as the pressure control chamber, and the one marked X as the pressure balancing chamber. The chambers A and C are the high air pressure receiving chambers; E the intermediate air pressure discharge chamber; and F the low air pressure discharge chamber.

In other words, under normal working conditions and with an outflow of average volume, or more, there are three stages of air pressure simultaneously present in the apparatus, namely, high, intermediate and low, the latter, however, being but slightly different than the second stage except when a heavy draft is made on the service line.

The apparatus herein described has, in actual practice, acquitted itself very satisfactorily. Service line pressures and volume of outflow are maintained as nearly constant as is demanded in commercial use. In every particular our air-reducing and regulating device has fulfilled all requirements of apparatus of this character.

What we claim is:

1. A device of the class described comprising a body having a chamber into which fluid raised to a high pressure is admitted, and a chamber from which this fluid, after being reduced to a relatively lower pressure is discharged into a service line, a flexible diaphragm, a single-seat valve, opening and closing in response to movement of said diaphragm, disposed in said high pressure fluid chamber, the high pressure fluid acting, normally, to close the valve, a chamber above, and fully open to, said diaphragm, means to raise the pressure of the fluid in the last mentioned chamber to a predetermined point, recourse being had to the high pressure fluid supply, valve means to seal said last named chamber when the fluid has been raised to the predetermined pressure, a chamber beneath said diaphragm, in communication with the said discharge chamber, means to control, either to increase or decrease, the volume of fluid capable of passing between the two last mentioned chambers, an intermediate chamber disposed next adjacent said valve, said chamber having a vent capable of passing in extremely small volume the fluid it contains to the chamber beneath said diaphragm, the fluid passed being of slightly higher pressure than normally obtains in the discharge chamber, and a nozzle extending from said intermediate chamber, substantially through said discharge chamber, to said service line, whereby the fluid passing through the nozzle increases its velocity and produces a slight rarefaction of the fluid in said discharge chamber.

2. An air-pressure-reducing and regulating device comprising a body member having a high air pressure receiving chamber, two chambers through which air of relatively but different lower pressures is successively discharged, a main single-seat valve interposed between said air-receiving chamber and the first of the two air-discharging chambers, a hollow bonnet member superimposed on said body member and fixedly secured thereto, a diaphragm disposed between said body member and said bonnet member, said diaphragm defining the bottom side of a pressure control chamber within the bonnet member, and further defining the top side of a pressure balancing chamber in the body member, means incorporated in said body member, including a labyrinth of ports, for admitting air from said high air pressure receiving chamber to said pressure control chamber, valves associated with, and adapted to close, said labyrinth of ports, by manual actuation thereof, when the air pressure in said pressure control chamber reaches any predetermined point, and means to conduct fluid from said pressure-balancing chamber to the second of the two first mentioned, discharge chambers, and into said pressure-balancing chamber from the first of the two first mentioned, discharge chambers.

3. A device of the class described comprising a body member, a high-pressure-air-receiving chamber in said body member, two interconnected discharging chambers, carrying reduced and relatively different air pressures, disposed in said body member, a single-seat valve adapted to open and close communication between the high air pressure chamber and the next adjacent reduced air pressure chamber, a valve seat made of material harder than said valve, a cross-section outline thereof embodying a vertical line intersected by a horizontal one, leaving a square corner, a valve spindle extending upwardly from said valve, a rubber diaphragm, two plates embracing, respectively, both upper and lower sides of said diaphragm, except at its marginal portions, the lower one of the plates impinging on the top of said spindle, a bonnet member, a pressure control chamber in said bonnet member, the bottom side being defined by said upper diaphragm plate, a pressure-balancing chamber formed by a depression in the top of the body member, the top thereof being defined by said lower diaphragm plate, an air-passage-way providing communication between the outer one of said reduced air pressure chambers and said pressure-balancing chamber, air-communication means between the inner one of the two said reduced air pressure chambers and said pressure balancing chamber, said means being of relatively smaller capacity than said ports, and means whereby the air in said pressure control chamber may be raised to and maintained at any predetermined pressure.

4. A fluid-pressure-reducing and regulating device having connection with a service pipe line, comprising a body member, an inflow chamber adapted to receive fluid from a high-pressure source of supply, a diaphragm assembly, including a diaphragm fixedly secured at its margins to said body member, and two embracing plates, two diaphragm chambers, one above and the other beneath said diaphragm assembly, the upper of said chambers, for substantially its full area, opening directly on to the top of said diaphragm assembly, means to raise the fluid in the upper of the two said chambers to any predetermined pressure, recourse being had to the high-pressure source of supply, means to seal said upper chamber whereby a substantially constant pressure may be maintained therein, a single-seat valve adapted to rise and fall in response to movements of said diaphragm, a chamber E, constituting the outlet space for air immediately it passes to the low pressure side of the valve, a chamber F disposed outwardly adjacent chamber E, a nozzle, interconnecting chambers E and F, disposed axially of and with its outer end in close proximity to said service pipe line, a relatively small orifice connecting chambers E and the lower diaphragm chamber, and a relatively large, capacity-controlled port-way interconnecting chamber F with the lower diaphragm chamber.

5. A fluid-pressure-reducing and regulating device having connection with a service pipe line comprising in combination a body member, an inflow chamber adapted to receive fluid from a high pressure source of supply, a diaphragm, two diaphragm chambers, one above and the other beneath said diaphragm, a valve operating in response to movements of said diaphragm, an outlet chamber adapted to receive fluid passing said valve and initially reduced in pressure, a second chamber disposed outwardly adjacent said outlet chamber and in which the fluid undergoes a second reduction in pressure, a nozzle disposed axially of said service pipe line, with its outer end in close proximity thereto, interposed between the two last mentioned chambers, a small orifice providing communication between the first of the two last mentioned chambers and the chamber beneath said diaphragm, and a capacity-controlled port-way, relatively larger than said small orifice, providing communication between the second of the two last mentioned chambers and the lower diaphragm chamber.

FRANK E. THOMES.
ALBERT E. NUGENT.